3 Sheets—Sheet 1.

W. R. BAKER & C. B. WITHINGTON,

Assignors to C. H. & L. J. McCORMICK.

Grain-Binder.

No. 8,702. Reissued May 6, 1879.

WITNESSES

Wm A Skinkle,

Geo W Breck

INVENTORS

Baker & Withington

By their Attorneys

Baldwin Hopkins & Peyton

N. PETERS, PHOTO-LITHOGRAPHER, WASHINGTON, D. C.

W. R. BAKER & C. B. WITHINGTON,

Assignors to C. H. & L. J. McCormick.

Grain-Binder.

No. 8,702. Reissued May 6, 1879.

*WITNESSES*

Wm A Skinkle

Geo H Breck

*INVENTORS*

Baker & Withington

*By their Attorneys*

Baldwin Hopkins & Peyton

N. PETERS, PHOTO-LITHOGRAPHER, WASHINGTON, D. C.

W. R. BAKER & C. B. WITHINGTON,

Assignors to C. H. & L. J. McCormick.

Grain-Binder.

No. 8,702. Reissued May 6, 1879.

*WITNESSES*

Wm A Skinkle

Geo W Beck

*INVENTORS*

Baker & Withington

*By their Attorneys*

Baldwin Hopkins & Peyton

N. PETERS, PHOTO-LITHOGRAPHER, WASHINGTON, D. C.

UNITED STATES PATENT OFFICE.

WILLIAM R. BAKER, OF CHICAGO, ILLINOIS, AND CHARLES B. WITHINGTON, OF JANESVILLE, WISCONSIN, ASSIGNORS TO C. H. & L. J. McCORMICK, OF CHICAGO, ILLINOIS.

IMPROVEMENT IN GRAIN-BINDERS.

Specification forming part of Letters Patent No. 201,149, dated March 12, 1878; Reissue No. 8,702, dated May 6, 1879; application filed April 12, 1879.

*To all whom it may concern:*

Be it known that we, WILLIAM R. BAKER, of Chicago, in the county of Cook and State of Illinois, and CHARLES B. WITHINGTON, of Janesville, in the county of Rock and State of Wisconsin, jointly have invented a new and useful Improvement in Grain-Binders, of which the following is a specification.

Our invention relates to and constitutes an improvement upon the well-known "McCormick binder," more especially as exemplified in Letters Patent No. 191,096, granted May 22, 1877, to William R. Baker, and in the application of Lambert Erpelding, assignor to C. H. & L. J. McCormick, filed January 27, 1877, and patented as No. 205,067, June 18, 1878.

Our invention relates to the mechanism which gives a half-revolution to the twister on the forward movement of the binding-head. Its object is to prevent breakage should the operator carelessly leave the pin which locks the differential gear out of engagement with its locking pawl or latch, which liability we obviate by allowing the stud or push-bar which moves said gear lateral play, and providing it with a spring, which normally retains it in its proper position, but yields when a rigid obstacle is encountered.

Figure 1:
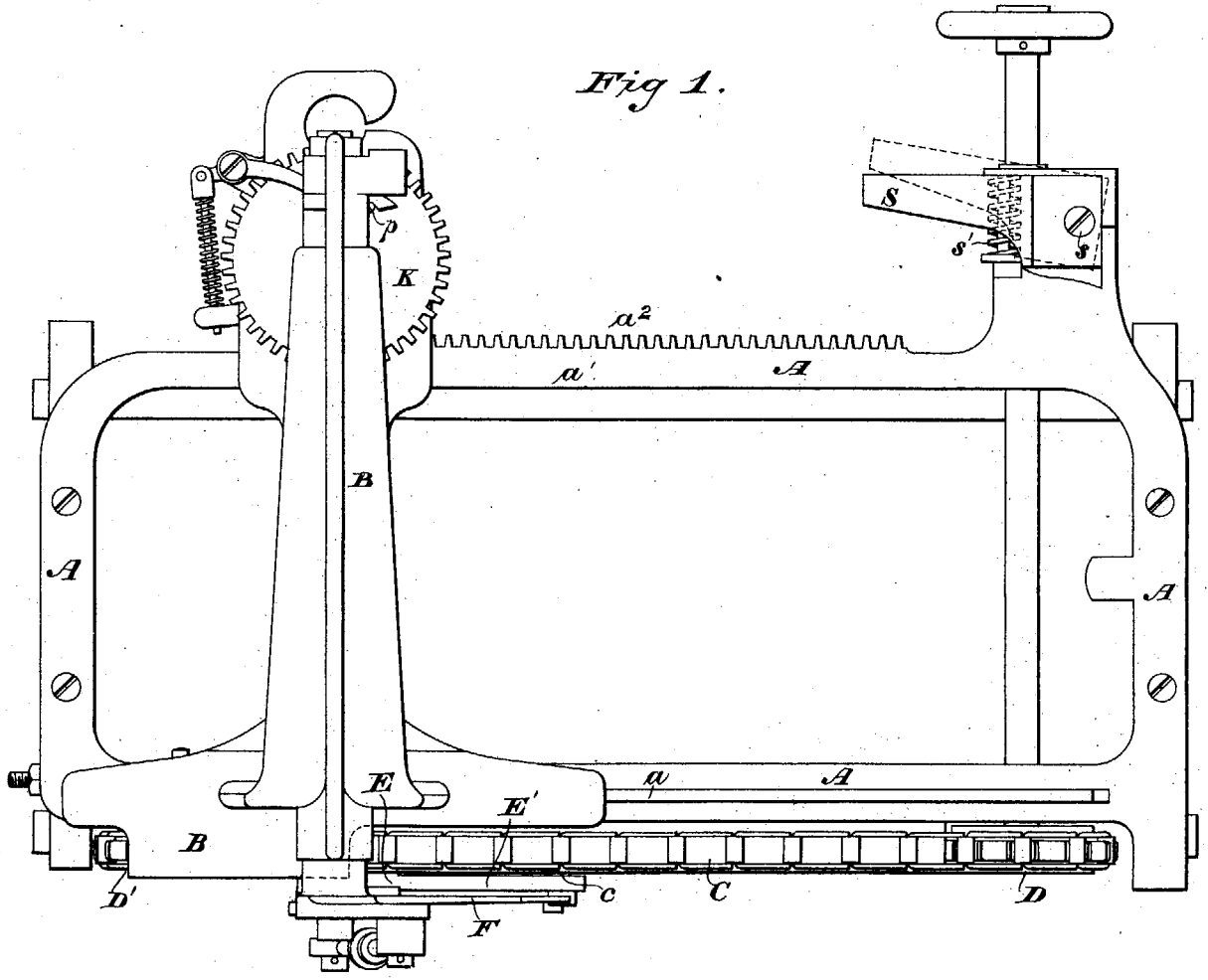
Figure 2:
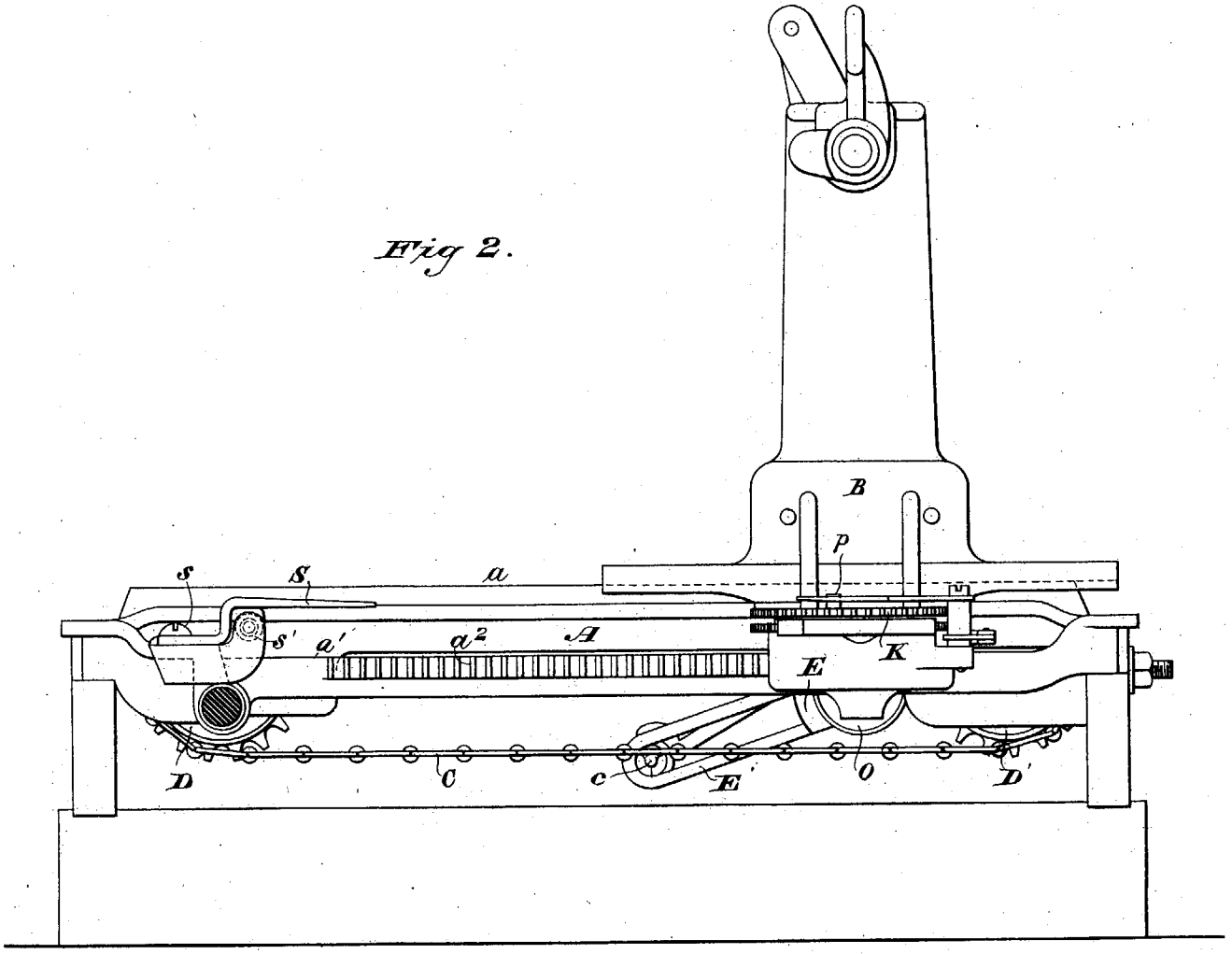
Figure 3:
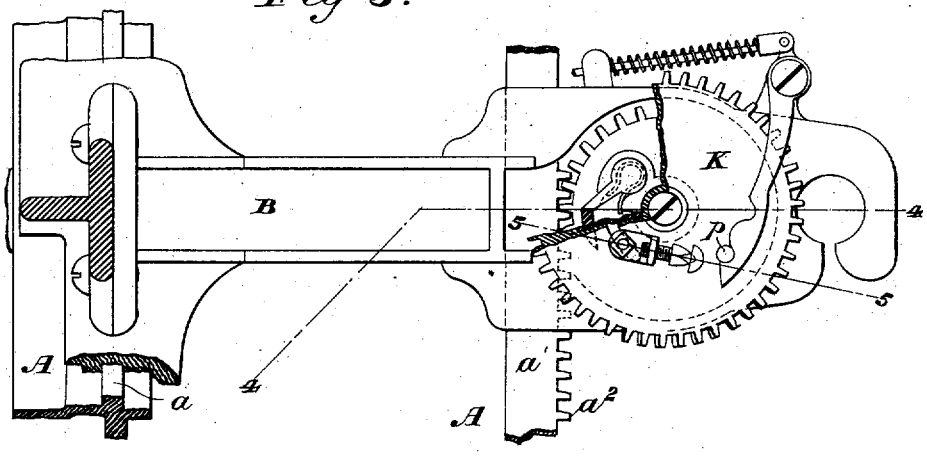
Figure 5:
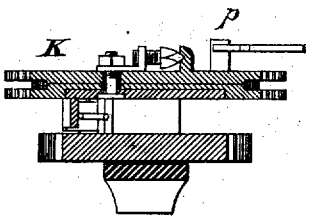
Figure 4:
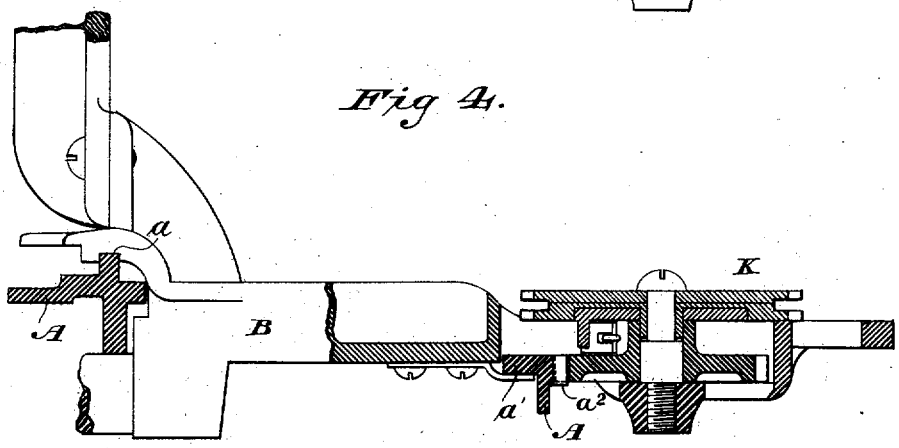

In the accompanying drawings, which represent so much of a McCormick binder with our improvement applied thereto as is necessary to illustrate the subject-matter herein claimed, Figure 1 represents a plan or top view; Fig. 2, a front elevation thereof, showing the parts in the position they occupy at the moment the binding-arm begins to move forward in its uplifted position. Fig. 3 represents a plan or top view of the differential gear and traversing carriage, with parts broken away to show the construction more clearly. Fig. 4 represents a view, in elevation, of the parts shown in Fig. 3, partly in section, on the line 4 4 of said figure. Fig. 5 represents a vertical diagonal section through the differential gear on the line 5 5 of Fig. 3.

It is deemed unnecessary to describe in detail the construction of the binder, as it is fully exemplified in patents heretofore granted to ourselves and the said Erpelding, both jointly and severally.

A represents the binder-frame, provided with ways $a$ $a^1$, (upon which the binding-carriage B reciprocates,) and with a rack, $a^2$, for actuating the twisting mechanism. The binding-carriage is reciprocated by means of a driving-chain, C, running over sprocket-wheels D D′, and driven in usual well-known ways. The chain is tightened to compensate wear by means of an adjusting-screw, which controls the movable bearing in which one of the sprocket-wheels is mounted.

A pin, $c$, on the driving-chain works in a slot in one arm, E′, of the elbow-crank E, mounted on a stud-axle on the traversing carriage. The carriage is held stationary at each end of its stroke while the binder-arm is closing around the bundle, as well as in opening, by pins and a half-shell, O, on the elbow-crank, as described in Baker's patent above mentioned.

The differential gear K, which drives the cutters and twisting mechanism, is, in its general construction, similar to that shown and described in the application of Erpelding above mentioned. It is, however, for convenience of construction, shown as made in two sections or disks bolted together.

The organization of this machine is such that as the twisting mechanism moves forward to carry the wire around the bundle a half-turn is given to the twister-pinion to carry the first wire that enters the jaws of the twister around its back, so as to be opposite the second wire which enters. This operation is caused by a stud-pin, $p$, on the differential gear K abutting against the stud or push-bar S on a fixed portion of the frame.

In the Erpelding application above mentioned, this stud or push-bar is rigid. Consequently, if the operator should carelessly leave the stud-pin $p$ out of gear with the latch, or in a line between the hub of the differential gear and the push-bar S, it might break the machine. To obviate this difficulty we pivot the push-bar S upon a pivot, $s$, so as to allow it a slight lateral or horizontal play, and maintain it in its normal position by a spiral spring, *s'*, (See Figs. 1 and 2.) Under this construction. when the stud *p* strikes the push-bar S squarely, and is in proper position, the differential wheel K is rotated; but when the pin is out of position it strikes upon the sloping side of the push-bar, which yields laterally, and thus prevents injury to the differential gear.

The operation of our improvement will readily be understood from the foregoing description.

We disclaim as our joint invention the combination of the reciprocating binding-carriage, the slotted intermittently-rotating crank mounted thereon, the traversing driving-chain, carrying a pin working in a slot in the crank-arm the locking-latch pivoted upon the crank-arm and simultaneously acting upon the pin of the driving-chain, and the pitman which actuates the binding-arm, whereby the binding-carriage and binding-arm are automatically locked in position and released at the proper moment by a single instrumentality, as the subject-matter is the sole invention of Charles B. Withington aforesaid.

We also disclaim the combination of the lug on the turning-plate and mechanism for securing said plate when adjusted, mounted upon the differential gear, whereby the proper relation of the parts of the twister is preserved, notwithstanding variations in the length of the driving-chain, as this subject-matter is the sole invention of William R. Baker aforesaid.

What we claim as our own joint invention, and desire to secure by Letters Patent, is—

The combination, substantially as hereinbefore set forth, of the differential gear actuating the twister and the laterally-yielding push-bar.

WM. R. BAKER.
CHAS. B. WITHINGTON.

Witnesses:
JOHN V. A. HASBROOK,
JOHN BIRKHOLZ.